July 8, 1969 R. W. DIETLEIN 3,454,072
INTERNAL RING LOCKED INSERT
Filed May 23, 1967 Sheet 1 of 2
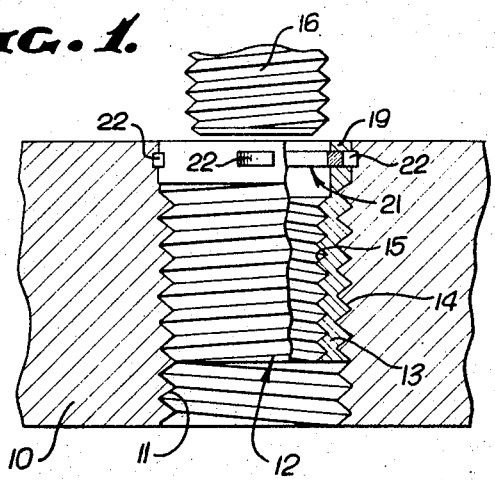
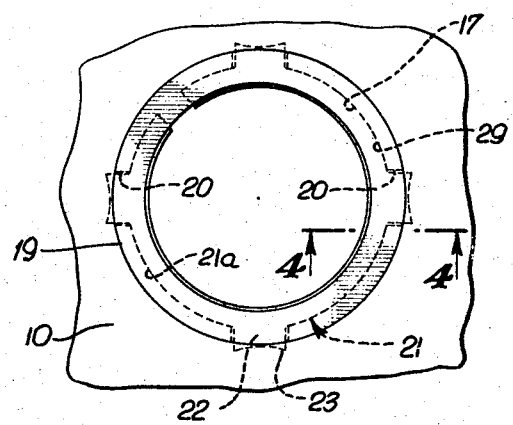
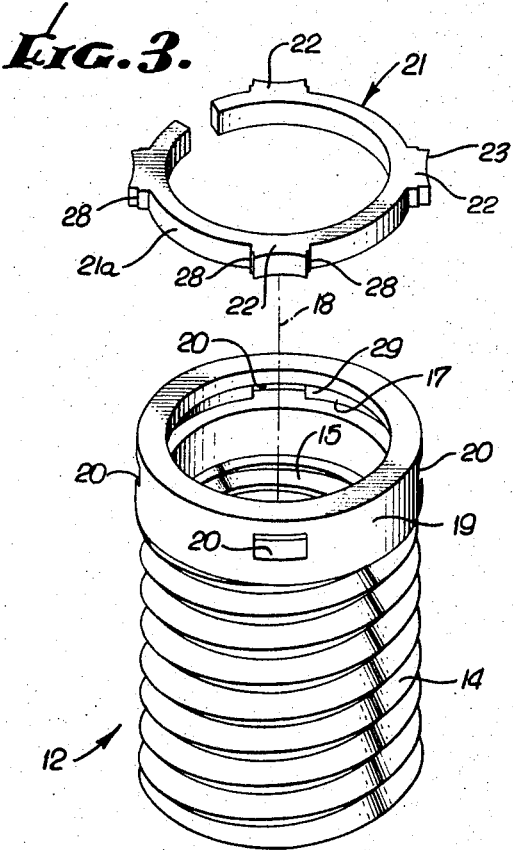
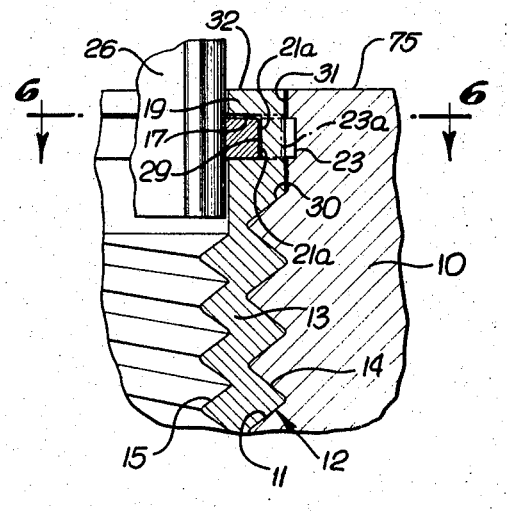
INVENTOR.
ROBERT W. DIETLEIN
By White & Haefliger
ATTORNEYS.

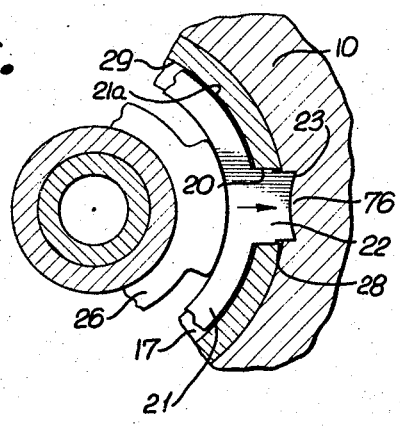
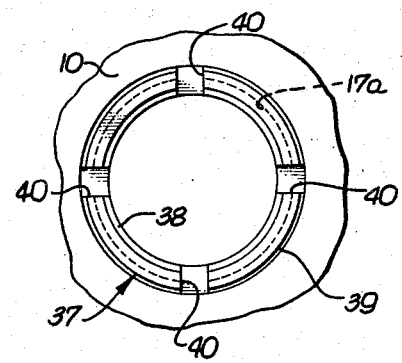
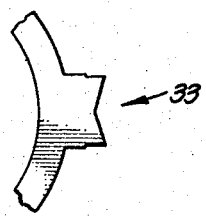
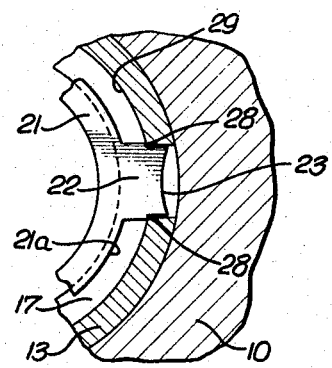
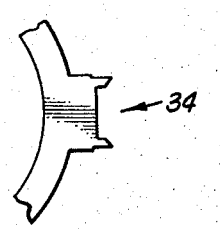
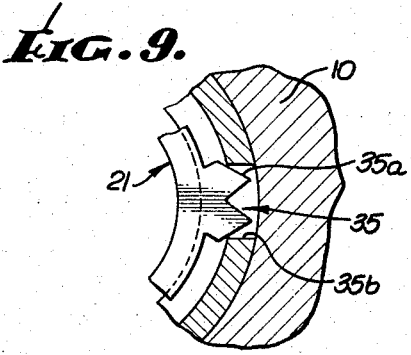
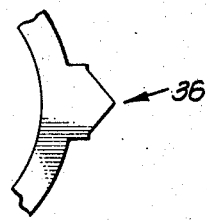
INVENTORS
ROBERT W. DIETLEIN
By White & Haefliger
ATTORNEYS.

United States Patent Office 3,454,072
Patented July 8, 1969

3,454,072
INTERNAL RING LOCKED INSERT
Robert W. Dietlein, 2904 Harmony Place,
La Crescenta, Calif. 91214
Filed May 23, 1967, Ser. No. 640,602
Int. Cl. F16b *39/00, 13/04;* E04b *1/48*
U.S. Cl. 151—41.73          7 Claims

ABSTRACT OF THE DISCLOSURE

The disclosed invention concerns a two piece captive construction fastener which eliminates need for notching at the outer surface of parent material; a split ring is outwardly expansible in a groove formed in the insert shank, to carry tooth means outwardly beyond the shank periphery to penetrate the work bore.

Background of the invention

This invention relates generally to fastener devices, and more particularly concerns improvements in insert type fasteners.

While many different forms of insert type locking devices have been devised in the past, they have suffered from one or more critical disadvantages. Among the latter are absence of two piece captive assembly construction; lack of capacity for easy removal and replacement without drill-out; incompatibility of use in extremely hard base or bore forming material environments; lack of self-gaging for depth and inability of use in critical edge distance applications; lack of means to prevent the insert from working loose from the base material; and other problems of fabrication, assembly and operation.

Summary of the invention

It is a major object of the present invention to provide a fastener insert and locking ring of two-piece captive construction which will overcome the disadvantages mentioned above. Basically, the device comprises an insert shank having exterior threading adapted to screw forwardly into the work interior threading, the shank having an interior groove opening inwardly toward the axis of the shank, and the shank forming slot means such as multiple slots communicating generally radially between the groove interior and the shank exterior; a split ring retained axially in the groove and in a condition of contraction relative to the axis; tooth means on the ring projecting generally outwardly for displacement outwardly of the slot means; and the ring being outwardly expansible in the groove and to an extent carrying the tooth means terminal generally outwardly sufficiently beyond the periphery of the shank as to penetrate the work bore for blocking relative rotation of the shank relative to the work. Typically, the tooth means comprises one or more teeth received in slots spaced about the insert axis; the teeth have shoulders spaced inwardly relative to the teeth outer extremities for interference engagement with the shank to block initial expansion of the ring from contracted condition, the shoulders being deformable to accommodate forcible outward expansion of the ring; and the ring is sized to have expanded position characterized in that the ring inner boundary is outside a cylinder defined by the root diameter of the shank interior thread. Of distinct advantage is the elimination of "notching" at the outer surface of the parent material, the teeth being spaced inwardly of that surface. This factor greatly increases fatigue life of the parent material, as so-called "stress risers" associated with notching at the outer surface are eliminated.

Other objects and advantages of the invention include the provisions of shank interior threading to receive advancement of a screw part acting to hold the ring in expanded condition in the groove; the provision in one form of the invention of annular shank structure blocking direct axial communication of the slots or windows with the rearwardmost end face of the shank; and the provision in another form of the invention of slots having direct axial communication with the rearwardmost end face of the shank.

These and other objects and advantages of the invention, as well as the details of illustrative embodiments, will be more fully understood from the following detailed description of the drawings, in which:

Brief description of the drawings

FIG. 1 is a vertical section showing installation of the insert in base material, after expansion of the split ring teeth;

FIG. 2 is a top plan view of the insert after lock ring expansion;

FIG. 3 is an exploded perspective showing the form of lock ring and insert shank used in FIG. 2;

FIG. 4 is an enlarged vertical section taken on line 4—4 of FIG. 2;

FIGS. 5 and 6 are fragmentary horizontal sections showing a locking ring tooth before and after outward expansion;

FIGS. 7–10 show various locking ring tooth forms; and

FIG. 11 illustrates a modified insert construction.

Referring first to FIG. 1, the base material is shown at 10, and may be quite hard, or may typically consist of magnesium or aluminum. It contains a threaded bore 11 into which the fastener insert of the invention is forwardly or downwardly received. The illustrated insert 12 comprises a tubular shank 13 having exterior threading 14 engaging the threaded bore 11, as well as interior threading 15 to receive a threaded stud 16.

Extending the description to FIGS. 3 and 4, the shank has an annular groove 17 opening inwardly toward axis 18, the groove typically being formed in the shank head 19, although it may be formed at other places along the shank length. Also, the shank forms slot means, as for example the four windows or slots 20, communicating generally radially between the groove interior and the shank exterior at locations spaced circularly about axis 18.

The fastener assembly also includes a split ring 21 retained axially in the groove and in initial condition of contraction relative to the axis 18, as for example as illustrated in FIG. 5. Tooth means on the ring is shown to comprise four teeth 22 although less than or more than four teeth are usable. The teeth project generally outwardly for displacement outwardly of the slots; also, the ring 21 is outwardly expansible in the groove 17 and to limited extent (as for example as seen in FIG. 6) carrying the teeth terminals 23 generally outwardly sufficiently beyond the periphery of the shank as to penetrate the work bore for blocking relative rotation of the shank relative to the work. Note in this regard the broken line 23a in FIG. 4 showing the inwardly retracted position of the tooth terminal, and the full line 23 showing the tooth terminal penetrating the work. In the latter condition, the ring periphery 21a is expanded proximate the inner wall of the groove 17, which limits ring expansion. Finally, FIGS. 4 and 6 show a tool 26 expanding the ring upon tool insertion into the tubular shank. Alternatively, the threaded stud may be advanced to expand the ring, the stud also acting to block inward contraction of the ring and loosening of the fastener from the work.

Expansion of the ring from initially contracted position is resisted by teeth side shoulders 28 spaced inwardly relative to the teeth outer extremities 23 for interference engagement with the shank at the walls 29 of slots 17, the interengagement being deformable to accommodate forcible outward expansion of the ring. Thus, the tooth material may be softer than the material of the insert, or vice versa, to accommodate such deformation. The tooth is recessed at 76 in FIG. 6 to receive parent material extrusion into the recess.

Note that the insert head 19 in FIG. 4 is self-bottoming (self-gaging for depth) as by seating at shoulder 30 defining the inner extent of the counterbored hole 31 in the work. Thus, the outer face 32 of the insert head is properly poistioned with regard to the outer and rearward surface 75 of the work, prior to expansion of the teeth. If the insert should need to be replaced, a sharp pick or similar tool can be used to pry the locking ring out by contraction thereof to release the teeth from the work. The insert can then be rotatably backed out and replaced, all without drilling out the insert or work. This is of great advantage in that the opening in the work need not be re-tapped or otherwise reformed.

Note also that the teeth are everywhere spaced from work rearward surface 75, so that no "notching" of the work occurs at the intersection of bore 31 with surface 75. This eliminates stress risers at surface 75 which could greatly reduce fatigue life, and therefore the invention contributes greatly to safety.

FIGS. 7–10 show various forms of locking ring teeth terminals at 33–36 that may alternately be used in place of the crescent shape of FIGS. 5 and 6. Note in FIG. 9 the slight interference between the tooth tapered walls or shoulders 35a and the walls of the slot 35b, such interference being deformable to accommodate forcible outward expansion of the ring. The FIGS. 7–9 teeth are also recessed to receive extrusion of parent material into such recesses. FIG. 11 shows a modified tubular insert 37 that is interiorly and exteriorly threaded at 38 and 39 throughout the lentgh of the insert. Also, the slots 40 are cut endwise into the end face of the insert to receive the teeth on the locking ring with less contraction of the ring than is necessary to enter the teeth into the insert slots in the embodiment of FIGS. 1–6. Note the inner wall of the undercut groove seen at 17a.

Finally, in special applications, the FIGS. 1–6 insert can be locked in place by injection of an adhesive through the holes 20, the adhesive bonding to the bore of the work and to the insert.

I claim:

1. A fastener insert adapted for connection in work having a bore the forward extent of which is interiorly threaded, comprising
    an insert shank having exterior threading adapted to screw forwardly into the work interior threading,
    the shank having an annular groove opening inwardly toward the axis of the shank, the shank forming at least two slots communicating generally radially between the groove interior and the shank exterior,
    a split ring retained axially in the groove and in an initial condition of contraction relative to said axis,
    tooth means on the ring projecting generally outwardly for displacement outwardly of said slots, said tooth means comprising at least two teeth received in said slots and spaced about said axis,
    the ring being outwardly expansible in the groove and to an extent carrying the tooth means terminal generally outwardly sufficiently beyond the periphery of the shank as to penetrate the work bore for blocking relative rotation of the shank relative to the work,
    and there being shoulders on the ring spaced inwardly relative to the teeth outer extremities and presented for interference engagement with the shank to block initial expansion of the ring from said contracted condition, the interengagement being deformable to accommodate forcible outward expansion of the ring.

2. The fastener insert of claim 1 wherein the shank is interiorly threaded about said axis to receive advancement of a screw part acting to hold the ring in expanded condition in the groove.

3. The fastener insert of claim 1, in which the ring is sized to have expanded position characterized in that the ring inner boundary is outside a cylinder defined by the root diameter of the shank interior thread.

4. The fastener insert of claim 1, wherein annular shank structure blocks direct axial communication of the slots with the rearwardmost end face of the shank.

5. The fastener insert of claim 1, wherein the slots have direct axial communication with the rearwardmost end face of the shank.

6. The fastener of claim 1 including said work having said bore which intersects an outer and rearward surface of the work, said tooth means being everywhere spaced from said rearward surface.

7. In an assembly including a fastener insert receivable in a work bore the forward extent of which is interiorly threaded, the combination comprising
    an insert shank having exterior threading screwed forwardly into the work interior threading;
    the shank having a groove opening inwardly toward the axis of the shank and extending thereabout, the shank forming slot means communicating generally radially between the groove interior and the shank exterior,
    a split ring retained axially in the groove and in an initial condition of contraction relative to said axis,
    tooth means on the ring projecting generally outwardly for displacement outwardly of said slot means, said tooth means received in said slot means,
    the ring being outwardly expansible in the groove and to an extent carrying the tooth means terminal generally outwardly sufficiently beyond the periphery of the shank as to penetrate the work bore for blocking relative rotation of the shank relative to the work,
    and the assembly having interengagement shoulder means presented proximate said slot means for blocking initial expansion of the ring from said contracted condition, the interengagement being deformable to accommodate said outward expansion of the ring.

References Cited

UNITED STATES PATENTS

| 1,474,239 | 11/1923 | Collins | 151—14 |
| 1,494,660 | 5/1924 | Brandstetter | 151—41.74 |
| 2,832,390 | 4/1958 | Kustusch | 151—41.74 |
| 2,849,046 | 8/1958 | Cummaro | 151—41.73 |
| 3,269,251 | 8/1966 | Bass | 85—66 |

EDWARD C. ALLEN, *Primary Examiner.*

U.S. Cl. X.R.

85—66; 151—41.74